US006967994B2

(12) United States Patent
Boer et al.

(10) Patent No.: US 6,967,994 B2
(45) Date of Patent: Nov. 22, 2005

(54) METHOD FOR OPERATING A COMMUNICATION SYSTEM AND A COMMUNICATION SYSTEM WITH TRAINING MEANS

(75) Inventors: Jan Boer, Odijk (NL); Henk Van Bokhorst, Nijkerk (NL); Robert John Kopmeiners, Hengelo (NL); Kai Roland Kriedte, Woerden (NL); Rienk Mud, Wijk Bij Duurstede (NL)

(73) Assignee: Agere Systems Inc., Allentown, PA (US)

( * ) Notice: Subject to any disclaimer, the term of this patent is extended or adjusted under 35 U.S.C. 154(b) by 719 days.

(21) Appl. No.: 09/948,531

(22) Filed: Sep. 7, 2001

(65) Prior Publication Data
US 2002/0048317 A1 Apr. 25, 2002

(30) Foreign Application Priority Data
Sep. 20, 2000 (EP) .................................. 00308184

(51) Int. Cl.[7] ........................ H04L 27/22; H04L 27/14; H04L 27/06; H04L 5/16; H04K 9/00
(52) U.S. Cl. ...................................... 375/219; 375/316
(58) Field of Search ................................. 375/219, 316

(56) References Cited
U.S. PATENT DOCUMENTS
4,621,366 A * 11/1986 Cain et al. .................. 375/222

| | | | |
|---|---|---|---|
| 5,606,580 A | 2/1997 | Mourot et al. | 375/340 |
| 5,943,361 A | 8/1999 | Gilhousen et al. | 375/200 |
| 6,108,561 A | 8/2000 | Mallinckrodt | 455/522 |
| 6,363,107 B1 * | 3/2002 | Scott | 375/150 |
| 6,377,636 B1 * | 4/2002 | Paulraj et al. | 375/346 |
| 6,389,010 B1 * | 5/2002 | Kubler et al. | 370/353 |
| 6,584,164 B1 * | 6/2003 | Tuukkanen | 375/365 |
| 6,614,864 B1 * | 9/2003 | Raphaeli et al. | 375/371 |
| 2002/0075947 A1 * | 6/2002 | Lai et al. | 375/219 |

FOREIGN PATENT DOCUMENTS
EP  0615352 A  9/1994  .......... H04B 7/005
FR  2769447    4/1999

OTHER PUBLICATIONS
S. Bakhtiyari et al., "A Robust Type II Hybrid ARQ Scheme With Code Combining For Mobile Communications", IEEE, dated May 13, 1993, pp. 214-217.

* cited by examiner

Primary Examiner—Stephen Chin
Assistant Examiner—Jia Lu

(57) ABSTRACT

A system for operating a communication system comprising one or more transmitters and receivers. The transmitted signals are provided with a preamble for training the receiver and/or the transmitter being in communication. The quality of the received signal is measured and compared with a threshold. If the quality is higher or lower than said threshold, a short preamble processing or a long preamble processing, respectively, is used. More than one threshold and associated pairs of preambles having different length may be used.

25 Claims, 5 Drawing Sheets

METHOD FOR OPERATING A COMMUNICATION SYSTEM AND A COMMUNICATION SYSTEM WITH TRAINING MEANS

CROSS-REFERENCE TO RELATED APPLICATION

This application claims priority of European Patent Application No. 00308184.1, which was filed on Sep. 20, 2000.

BACKGROUND OF THE INVENTION

The invention relates to a method for operating a communication system comprising one or more transmitters and receivers, in which the transmitted signals are provided with a preamble for training the receiver and/or the transmitter being in communication.

Such a method is known from "IEEE 802.11b Wireless LAN standard". In this known method a preamble in transmitted signals is always needed, the length of the preamble needs not be fixed. If the propagation conditions are good, the preamble may be short, just enough to set the receiver parameters like frequency and timing offset. In worse conditions the detection of the signal may be difficult and training the receiver by means of the preamble may be even more difficult. In the latter conditions a longer preamble may help to train the receiver because of the possibly longer training period.

In recent communication systems higher data rates are introduced, impulsing the need for short preambles.

In known systems the problem is encountered that the receiver will not know for certain that a received signal will have a long or short preamble and whether the propagation channel will be good or bad, needing a short or long preamble respectively.

The invention has the object to provide a method of the above mentioned kind, in which the above mentioned problems are obviated such that with a tolerable detection quality the preamble having the as short as possible length is choosen and that thereby the throughput of the data is as high as possible.

SUMMARY OF THE INVENTION

This object is achieved by the invention in that the quality of the received signal is measured and compared with a threshold and that if the quality is higher or lower than said threshold, a short preamble processing or respectively a long preamble processing is used.

The invention has the advantage that without any prior knowledge of the propagation conditions the most favourable preamble processing is always used for having as high as possible throughput.

Further embodiments of the invention are specified in the method subclaims.

Moreover the invention relates to a communication system suitable for using the method according to one of the preceding claims, comprising one or more transmitters and receivers, in which the transmitted signals are provided with a preamble for training the receiver and/or the transmitter being in communication, which system is characterized in that the receiver is provided with a quality measuring device to the input of which the received signal is fed and at the output of which a quality measure signal is developed and with a comparator to one input of which the output of the quality measuring device is connected and to the other input of which a threshold signal is supplied, in which in response to the comparison, a short preamble or long preamble processing is used.

Further features of the invention are described in the system subclaims.

BRIEF DESCRIPTION OF THE DRAWINGS

The invention will be explained with reference to the drawings, in which are shown in.

DETAILED DESCRIPTION

In a (wireless) digital communication system, the transmitter and receiver need to adapt the transmitted signal to get correct reception. Mostly the receiver will do a number of adjustments, like amplification and filtering, as well as frequency offset and timing offset control. Also the propagation channel may be taken into account for better reception. In more advanced systems, the transmitter may also adjust the signal, like adapting output power of transmission scheme (data rate), depending on the response of the receiver.

In all those cases a certain training signal is needed which is transmitted before the data signal is applied. This training signal is called the preamble. The preamble does not contain useful data since it will not be reliably detected and thus is merely overhead. This overhead on the true payload (data) lowers the overall throughput and may become significant when a preamble is needed for every relatively short burst of data, i.e. packet data in a dynamic environment. The bursts become shorter when higher data rates are used (for constant data load) and thus the overhead of the preamble becomes relatively larger with higher data rates and limits the value of higher data rates.

Although a preamble is always needed, the length of the preamble needs not to be fixed. If the propagation conditions are good (little distortion and low noise) the preamble may be short, just enough to set the receiver parameters like frequency and timing offset. In harsh environments the detection of the signal may be difficult and training the receiver may be even more difficult. A longer preamble may help here to tune the receiver. Recently higher data rates (5.5 and 11 Mbps) are introduced, imposing the need for shorter preambles because of the desired low ratio of overhead and true payload.

Figure 1:
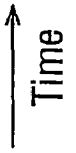
FIG. 1 the processing steps for a long preamble with and without antenna diversity.
Figure 2:
FIG. 2 processing steps for a short preamble with and without antenna diversity.

The implementation of the above idea of the long and short preambles in a communication system is difficult but of particular importance when higher data rates are introduced. The receiver will not know for certain that a signal will have a long or short preamble and whether the propagation channel will be good or bad, needing a short or long preamble respectively. It may start with the anticipation of the short preamble and continue with the training as long as the data section is not detected by means of a Start-of-Frame Delimiter (SFD). Although not impossible, it is rather difficult to do this in a practical implementation. In such an implementation the receiver will have a certain order of processing the preamble: 1) carrier detection (CD); 2) automatic gain control (AGC) and antenna selection (both optionally, may be combined with 1); 3) timing acquisition (tim.); 4) frequency offset compensation (may be interchanged with 3); 5) acquisition of the channel impulse response (optional). In FIG. 1 and FIG. 2 these processing steps for long and short preambles respectively are illustrated. The FIGS. 1 and 2 show the function of parts of the preamble aligned with the processing. The slack is to compensate for missed carrier detections and thus reduces the risk on missed SFDs. After this processing of the preamble, the detection of the SFD can start. Any of the processing steps may degrade in accuracy if the available time is shortened and if the previous step is less accurate. So first processing with the anticipation of the short preamble will perform worse in difficult environments compared to a receiver that anticipates on a long preamble and optimally uses the available training. Only sending long preambles will limit the throughput in situations where short preamble suffice and only processing long preambles prevents the usage of short preambles.

Instead of accepting worse performance or good performance for limited situations, the invention combines the short and long preamble detection in the receiver. The invention is that the receiver will first assess the signal quality of the received signal before it decides whether to use the short or long preamble processing. If the signal quality is good enough to use the short preamble, it only does the short preamble processing, even though a long preamble may be transmitted. If the signal quality is below a certain threshold, only the long preamble processing is started and packets with short preambles are lost. The threshold is set such that reception with a short preamble is likely to be unreliable, so the loss of the packet does not give additional system degradation.

Figure 3:
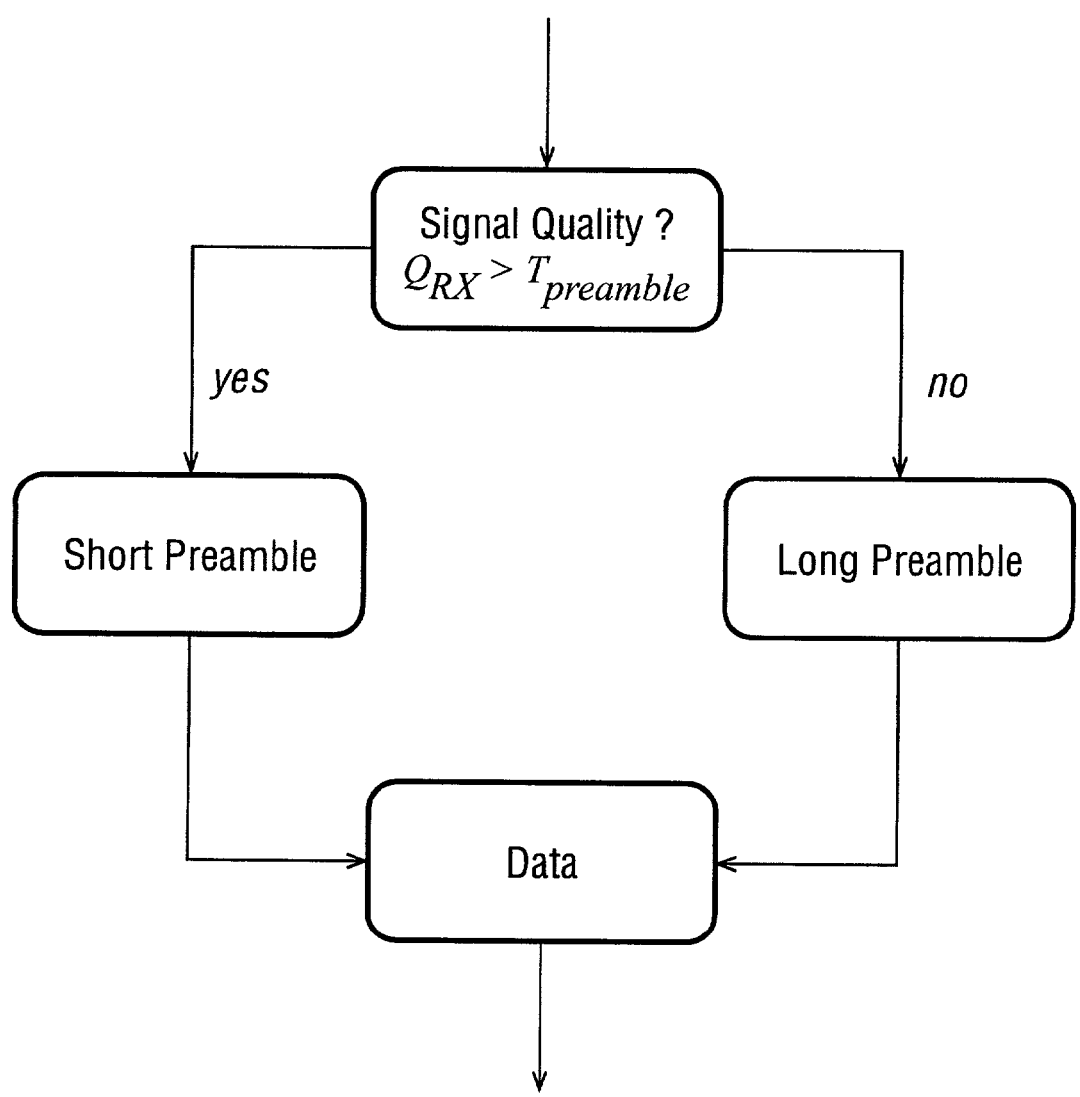
FIG. 3 a state diagram for preamble processing decision.

In FIG. 3 the state diagram of the above method of the invention is shown.

According to the invention it is decided to process with the anticipation of either a short or a long preamble. The quality of the received signal is measured in the receiver. This received signal quality measure $Q_{RX}$ must represent the environmental conditions such that it can indicate whether a short or long preamble will be sufficient and must be available before the processing starts. The signal quality measure $Q_{RX}$ is compared with a threshold $T_{preamble}$. If the signal quality is above the threshold ($Q_{RX} > T_{preamble}$) processing of the short preamble is used. If the signal quality is below the threshold ($Q_{RX} < T_{preamble}$) the long preamble processing should be used.

As quality measures, the signal-to-noise ratio, the signal strength or the signal peak value could be used. The signal-to-noise ratio and the signal strength could be derived from the automatic gain control usually used in communication systems.

The method of the invention assures that the optimum preamble length is chosen. Depending of the reliability of the signal quality assessment, some situations may not be covered and a fallback mechanism may apply. For instance the receiver will expect a retry with a long preamble and anticipate to that. Or the transmitter will use a fallback transmission scheme which is more reliable, either with a long preamble, or a more robust modulation, or both.

Figure 4:
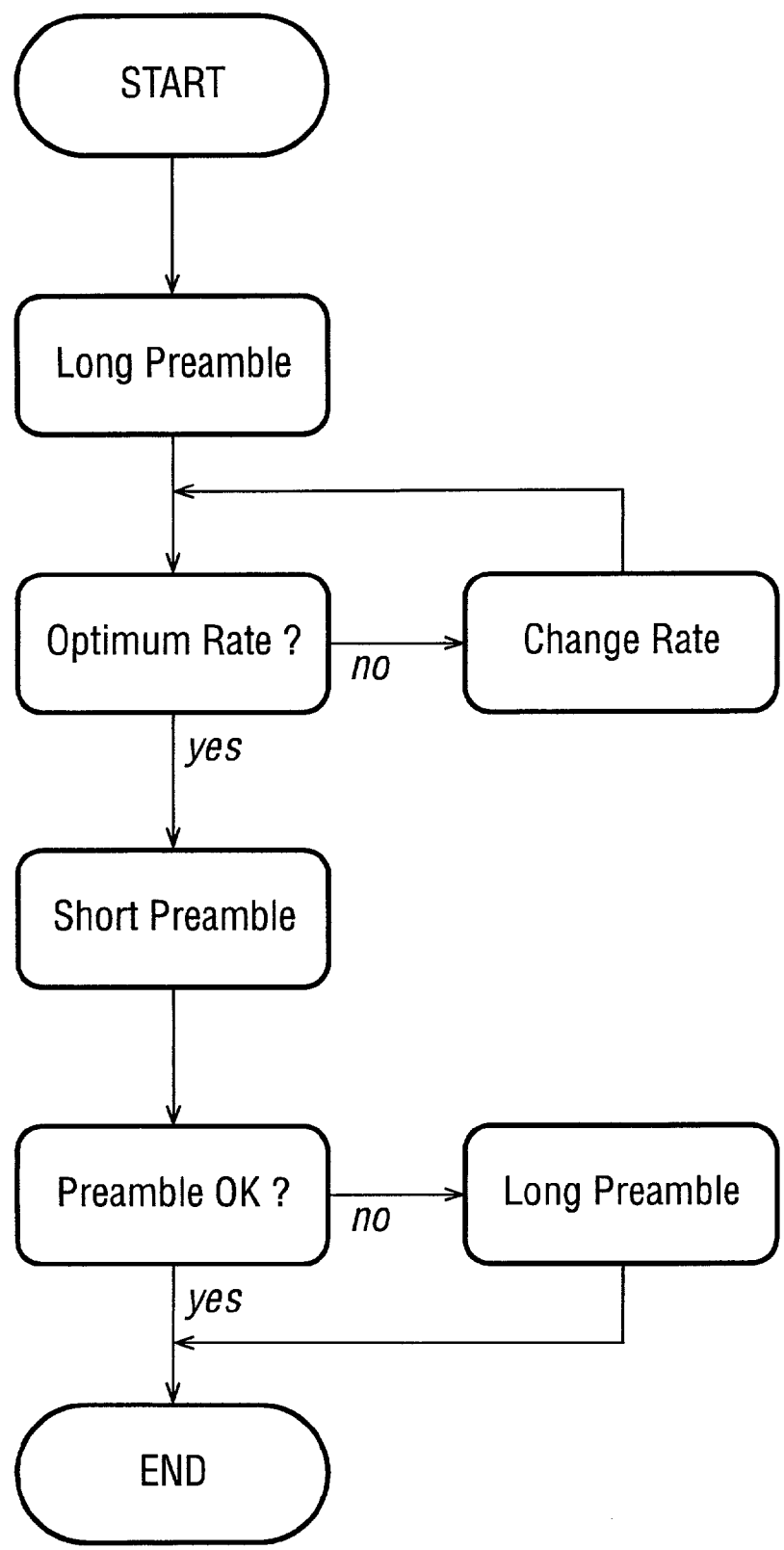
FIG. 4 a state diagram of a fallback algorithm.

The fallback mechanism will be explained now for a wireless LAN system by reference to FIG. 4.

Generally wireless LAN systems do not know the environmental conditions before transmission, so the rate must be adapted in response to (success of) earlier transmissions. As an extension to the invention, a fallback algorithm with long and short preambles in the wireless LAN system is proposed. Generally, fallback algorithms regard a lost packet as a result of the environmental conditions and switches to a more robust modulation or coding scheme as a response. The fallback algorithm according to the invention will use the long preamble as a robust step in the fallback mechanism but with less throughput, and the short preambles as a step with higher throughput but with less robustness. The ways to combine this with the fallback rates are various, depending on how robust the preambles are compared to the rates. Ideally the wireless LAN system measures the propagation conditions and determines the optimum rate and preamble length. Practically this may reduce to first decide which rate to use and then determine the preamble length. As illustrated in FIG. 4 it is started with a long preamble. Thereby the fallback algorithm is compatible with prior art systems, wherein only long preambles are used.

The optimum rate determination is based on the propagation conditions, for example, the occurrence frequency of the loss of a data packet. When the propagation conditions are sufficiently good an acknowledge signal is received at the transmitter. If the acknowledge signal is not received this means that the data rate is not optimal and this is changed. This loop runs until the optimum data rate is obtained with the sufficiently good propagation conditions.

Then the short preamble is set. In the second loop the preamble with the correct length is determined and set. Another solution is determining the preamble length first and then the rate. Other solutions are combinations of these two methods.

Figure 5:
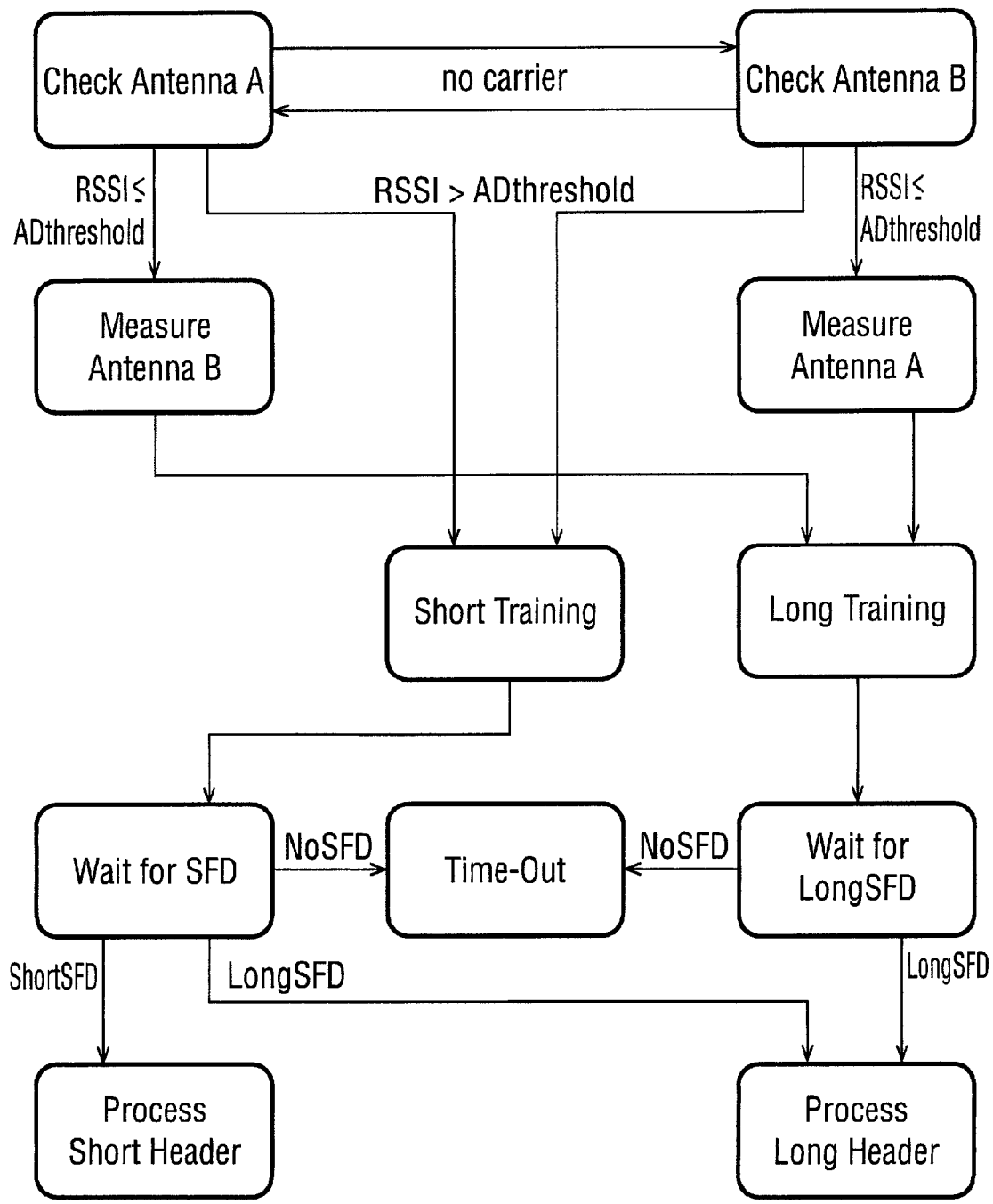
FIG. 5 a state diagram in the receiver for processing the long and short preamble.

In FIG. 5 a preferred implementation in an example of a wireless LAN high speed communication system is illustrated, where only the necessary details related to the invention are shown. Refinements in the process and signals for others purposes are left out.

The received signal quality measure of this invention must be known before the processing starts, so in this wireless LAN system the implementation is limited to measures like the received signal strength indicator (RSSI) or signal-to-noise ratio (SNR). In the preferred implementation full details about the environment are only known after the preamble.

To achieve maximum reliability for the long preamble processing, the processing steps for the long preamble with antenna diversity similar to FIG. 1 are followed. In the implementation that will be shown here, the Carrier Detection and AGC (The RSSI or SNR results from the AGC), are combined but this does not effect the available time for the other processing steps within the preamble. The preamble is 128 µs long after which the SFD of 16 µs starts. Then the header and data follows: The slotting is 20 µs so each 20 µs (with some slack) a new frame may start. The long preamble ends with a different SFD (LongSFD) than the short preamble (ShortSFD).

The short preamble is 56 µs long after which the ShortSFD of 16 µs starts. It is assumed that the AGC needs the same amount of time as with the long preamble and can be combined with the carrier detection algorithm with the same reliability as for the long preamble. If not combined, the system performance may be degraded significantly. Slack is still needed to decrease the probability on missing a SFD. Although the training time may be reduced, anticipating that the propagation conditions are quite good (signal quality $Q_{RX}$ is above a threshold $T_{preamble}$), there is likely too little time to do antenna diversity. So the short preamble processing is done, similar to the processing steps for the short preamble without of antenna diversity as shown in FIG. 2.

The implemented method of the invention is as follows. Every slot of 20 µs the antenna is toggled (ant. A⇌ant. B) and the selected antenna is measured on RSSI (by doing the AGC algorithm, but may be assessed in a different way as well without doing the AGC algorithm) and carrier presence (CD algorithm). The RSSI is taken as signal quality measure $Q_{RX}$.

If there is a carrier detected and the RSSI is above the antenna diversity threshold (ADthreshold) there will be no further antenna diversity and the short training will be started. In this embodiment AD threshold is equal to $T_{preamble}$, but this is not required. After the training the receiver will wait for the SFD and meanwhile the channel impulse is acquired from the received signal. The receiver will simultaneously check for the ShortSFD and LongSFD. If both SFDs are scrambled with a known pattern, the detection may be done on the scrambled SFDs. After detection the appropriate process for the short header or long header (following the short and long preamble respectively, counting information on the physical layer) is started.

If there is a carrier detected and the RSSI is below the ADthreshold the receiver checks the other antenna burst and selects the strongest for further processing (antenna diversity). The long training is started then and after the training the receiver will wait for the LongSFD while it acquires the channel impulse response from the received signal. After the SFD detection the processing of the long header is started.

The implemented wireless LAN system reacts dynamically to its environment with various fallback rates and long and short preambles. Since the transmitter does not know how the propagation channel to the receiver looks like, the implemented wireless LAN system assesses the propagation conditions at the transmitter based on the returned ACKs (acknowledgements from the receiver). If transmissions with a certain preamble length and rate fail (ACKs not received by transmitter), the transmitter will have to use a more robust scheme. On the other hand, when transmission is good for a certain number of frames (ACKs received by transmitter), the transmitter may try to transmit with a higher throughput scheme. Besides in rate (the lower the rate, the more robust the transmission scheme is), the preamble length could be used as part of the fallback algorithm, assuming that a longer preamble is more robust than the short preamble. There are various ways to combine this with fallback rates. One implementation is to determine the rate first with long preambles and then try a short preamble for better throughput.

In the implementation above the receiver makes an assessment on the signal quality with the RSSI as measure. This is not a perfect indicator and the RSSI may not in all situations appropriately indicate the conditions for the short or long preamble processing. For example if the multipath effects are strong the RSSI may be good but the receiver still needs longer training to tune to the heavily distorted channel (combating intersymbol-interference). The implementation described above will come into a deadlock because the receiver will only try short trainings since the RSSI is good. One solution is to force the usage of the long preamble of all terminals, which is a reasonable solution in such an environment. Another solution is a refinement to the invention regarding the fallback algorithm. Not only the transmitter takes part in the fallback algorithm, but the receiver as well. Suppose the receiver misses a SFD: it will switch into the time-out mode. After a number of time-outs (missing a number of SFDs) the receiver is forced to use the long training branch independent of the RSSI. Frames with short preambles are not received any more, but the transmitter will have the fallback method that results in a frame (retransmission) with long preamble.

The description of the inventions are based on a system with a long and a short preamble ability. Instead of two options for the preamble length the system may have more steps in preamble length or even a gradual preamble length, which allows the system to set the minimum required preamble for optimum throughput, depending on the assessed received signal quality.

The above mentioned methods steps could be implemented in system devices, but preferably in software.

The invention relates also to a communication system comprising one or more transmitters and receivers. The transmitted signals between transmitters and receivers in communication are provided with a preamble for training the receiver and/or transmitter. The receiver is provided with a quality measuring device to the input of which the received signal is fed and the output of which a quality value signal is developed. The output of the quality measuring device is connected to one input of a comparator and said comparator has another input, to which a threshold signal is supplied. The output of the comparator delivers a signal which represents the comparison result. In response to the comparison a short preamble or long preamble processing is selected and used. Two or more thresholds with associated pairs of preambles having different lengths could be used.

As quality measure a selection may be made among the signal-to-noise ratio, signal strength and signal peak value.

Usually a communication system is provided with an automatic gain control device, and advantageously the signal-to-noise ratio or the signal strength of the received signal is derived from said automatic gain control device.

Preferably the communication system is provided with a fallback device, which could comprise a data rate adjusting device and/or a preamble selector device, which devices are controlled dependent on the desired propagation conditions such as a minimum number of detection missings.

The above devices are not shown and described in details because those skilled in the art could build devices without any problem.

What is claimed:

1. A method for operating a wireless communication system having one or more transmitters and receivers, in which the transmitted signals are provided with a preamble for training the receiver and/or the transmitter, the method comprising:
   measuring the quality of the received signal,
   comparing the measured quality of the received signal to a threshold, and
   performing a predefined short preamble or a predefined long preamble processing in response to the comparing step.

2. The method according to claim 1, wherein more than one threshold and more than two preambles having different length are used.

3. The method according to claim 1, wherein a signal-to-noise ratio is used as the quality measure of the received signal.

4. The method according to claim 1, wherein the signal strength is used as the quality measure of the received signal.

5. The method according to claim 1, wherein the signal peak value is used as the quality measure of the received signal.

6. The method according to claim 1, wherein the quality measure is derived from an automatic gain control.

7. The method according to claim 1, wherein a fallback algorithm is used.

8. The method according to claim 7, wherein based on propagation conditions the optimum data rate is determined and used.

9. The method according to claim 6, wherein based on propagation conditions a correct working preamble length is selected.

10. The method according to claim 7, wherein a predetermined number of misses of the detection of the signal is used as measure for the propagation conditions.

11. The method according to claim 1, wherein if the quality of the received signal is higher than the threshold then predefined short preamble processing is selected, otherwise predefined long preamble processing is selected.

12. The method according to claim 7, wherein the transmitter is forced to use the long preamble in the absence of an acknowledgement of the correct propagation to be received the receiver.

13. The method according to claim 1, wherein before the step of performing short or long preamble processing, the step of performing antenna diversity is used.

14. A communication system having a transmitter and a receiver, in which a transmitted signal is provided with a preamble for training the receiver and/or the transmitter, the communication system comprising:
a receiver having a quality measuring device for receiving the received signal and for generating a quality measure signal, the receiver further having a comparator coupled to the quality measuring device for comparing the quality measure signal to a threshold signal, in which in response to the comparison, a short preamble or long preamble processing is used.

15. The communication system according to claim 14, wherein more than one threshold and more than two preambles having different length are used.

16. The communication system according to claim 14, wherein the signal-to-noise ratio is used as quality measure signal.

17. The communication system according to claim 14, wherein the signal strength is used as quality measure signal.

18. The communication system according to claim 14, wherein the signal peak value is used as quality measure signal.

19. The communication system according to claim 14, wherein the quality measure signal is derived from an automatic gain control device.

20. The communication system according to the claim 14, wherein a fallback device is used.

21. The communication system according to claim 20, wherein the fallback device is provided with a data rate adjusting device controlled by an acknowledgement signal, the acknowledgement signal identifying whether the transmitter signal was successfully received.

22. The communication system according to claim 21, wherein the fallback device is provided with a preamble selecting device that selects the correct working preamble length based on propagation conditions.

23. The communication system according to claim 21, wherein it is started with a long preamble.

24. The communication system according to claim 21, wherein the transmitter and receiver are forced to use the long preamble in the absence of an acknowledgement signal identifying successful reception of the transmitter signal.

25. The communication system according to claim 14, wherein before the decision of using the short or long preamble processing, antenna diversity is used.

* * * * *

UNITED STATES PATENT AND TRADEMARK OFFICE
CERTIFICATE OF CORRECTION

PATENT NO. : 6,967,994 B2
DATED : November 22, 2005
INVENTOR(S) : Boer et al.

It is certified that error appears in the above-identified patent and that said Letters Patent is hereby corrected as shown below:

Column 6,
Line 54, before "or" and after "preamble" insert -- processing --.

Column 7,
Line 34, before "short preamble" insert -- predefined --.
Line 35, before "long preamble" insert -- predefined --.

Column 8,
Line 35, before "short or long" insert -- predefined --.

Signed and Sealed this

Ninth Day of May, 2006

JON W. DUDAS
*Director of the United States Patent and Trademark Office*